United States Patent

Nagamura

[11] Patent Number: 5,832,746
[45] Date of Patent: Nov. 10, 1998

[54] ULTRA-HIGH PURITY NITROGEN TRIFLUORIDE PRODUCTION METHOD, AND UNIT THEREFOR

[75] Inventor: Takashi Nagamura, Kako-ken, Japan

[73] Assignee: Teisan Kabushiki Kaisha, Tokyo, Japan

[21] Appl. No.: 856,005

[22] Filed: May 14, 1997

[30] Foreign Application Priority Data

May 14, 1996 [JP] Japan .................................. 8-118898

[51] Int. Cl.[6] .......................................... F25J 1/00
[52] U.S. Cl. ................... 62/623; 62/626; 62/918; 62/928
[58] Field of Search .............................. 62/918, 623, 626, 62/928

[56] References Cited

U.S. PATENT DOCUMENTS

| | | | |
|---|---|---|---|
| 2,960,835 | 11/1960 | Gaumer, Jr. ................................ | 62/918 |
| 3,620,030 | 11/1971 | Iikubo et al. .............................. | 62/918 |
| 5,150,577 | 9/1992 | Mitchell et al. ........................... | 62/918 |
| 5,502,969 | 4/1996 | Jin et al. . | |
| 5,626,023 | 5/1997 | Fisher et al. .............................. | 62/918 |

FOREIGN PATENT DOCUMENTS

| | | |
|---|---|---|
| 0 345 354 | 12/1989 | European Pat. Off. . |
| 0 640 368 | 3/1995 | European Pat. Off. . |
| 7-330317 | 12/1995 | Japan . |

*Primary Examiner*—Ronald C. Capossela
*Attorney, Agent, or Firm*—Young & Thompson

[57] ABSTRACT

An ultra-high purity nitrogen trifluoride production method comprises: pressurizing a nitrogen trifluoride feed gas, eliminating moisture and carbon dioxide from the feed gas, and cooling down the same feed gas; causing the cooled feed gas to pass through adsorption columns, and introducing it into a medium-pressure rectification column by way of a reboiler in the medium-pressure rectification column, where it is rectified in the medium-pressure rectification column; introducing the resulting gas obtained by this rectification into a middle stage of a low-pressure rectification column, where it is rectified; and taking out ultra-high purity nitrogen trifluoride obtained by virtue of this rectification from the lower part of the low-pressure rectification column.

7 Claims, 1 Drawing Sheet

5,832,746

ULTRA-HIGH PURITY NITROGEN TRIFLUORIDE PRODUCTION METHOD, AND UNIT THEREFOR

FIELD OF THE INVENTION

The present invention relates to a continuous low temperature rectification unit for producing nitrogen trifluoride gas with a high purity from a nitrogen trifluoride feed gas by virtue of a rectifying action caused by the gas-liquid contact of a reflux liquid and a rising gas, and particularly to a continuous low temperature rectification unit for producing ultra-high purity nitrogen trifluoride which will be used for dry etching of semi-conductors or cleaning of a CVD apparatus.

BACKGROUND OF THE INVENTION

In a unit described in the official gazette of Japanese Patent Application Laid-open No. 330,317/1995, the following procedure is carried out. Raw $NF_3$, from which $N_2F_2$ and $CO_2$ have been previously removed and in which the purity of $NF_3$ is 10% or more, the total mole percentage of impurities $N_2$ and $O_2$ is 90% or less and the amount of $N_2O$ is 500 ppm or less, is introduced into the lower part of a distillation unit kept at a temperature of a liquefied gas to be used, and liquefied by a condenser in the upper part thereof. After a predetermined amount of raw $NF_3$ is charged in said distillation unit, $N_2$ and $O_2$ whose boiling points are lower than that of $NF_3$ are first discharged out of the upper part thereof, with carrying out temperature regulation on the lower part of a distillation column, the main body of the distillation column and the condenser in the upper part of the distillation column so that the inside of the distillation unit gets a given pressure. When such a condition is thereafter reached the concentration of $NF_3$ in a distillate liquid is a predetermined concentration (99.999 mol % or more), the total amount of $N_2$ and $O_2$ is 10 ppm or less and the amount of $N_2O$ is 1 ppm or less, a timer is actuated to open an extraction port below the condenser part so that the distillate liquid is distilled out to a receiver side.

The unit described in the official gazette of Japanese Patent Application Laid-open No. 330,317/1995 is constructed such that three very low temperature tanks are provided to separately insulate the colds of three constituent parts such as a condenser, a distillation column and the lower part of said distillation column, and these three very low temperature tanks are separately regulated in temperature, whereby high purity nitrogen trifluoride is made in the distillation column after a given period of time has elapsed from the introduction of a feed gas, and a timer is actuated to open an extraction port below the condenser part so that a distillate liquid is distilled out into a receiver. Accordingly, this deep cold distillation unit is a batch type distillation unit and hence it is a unit not adapted for the mass production.

Due to consideration of the aforementioned problems, the present invention is intended to provide a unit in which nitrogen trifluoride of ultra-high purity can be continuously produced by use of a simpler unit.

SUMMARY OF THE INVENTION

An ultra-high purity nitrogen trifluoride production method, according to the present invention, is characterized by the steps of: pressurizing a nitrogen trifluoride feed gas, eliminating moisture and carbon dioxide gas from said feed gas, and cooling down the same feed gas; causing the cooled feed gas to pass through adsorption columns, and introducing it into a medium-pressure rectification column by way of a reboiler in the lower part of said medium-pressure rectification column, where it is rectified in said medium-pressure rectification column; introducing the resulting gas obtained by this rectification into a middle stage of a low-pressure rectification column, where it is rectified; and taking out ultra-high purity nitrogen trifluoride obtained by virtue of this rectification from the lower part of said low-pressure rectification column.

An ultra-high purity nitrogen trifluoride production method, according to the present invention, is further characterized by having further a step of warming, in an outside, a liquid reservoired in the bottom of said medium-pressure rectification column so that low-boiling point components dissolved in said liquid are evaporated and returned to said medium-pressure rectification column.

An ultra-high purity nitrogen trifluoride production method, according to the present invention, is further characterized in that the pressure of said low-pressure rectification column is an operation pressure of 1~7 $kg/cm^2$.

An ultra-high purity nitrogen trifluoride production method, according to the present invention, is further characterized in that the pressure of said medium-pressure rectification column is an operation pressure of 5~30 $kg/cm^2$.

An ultra-high purity nitrogen trifluoride production method, according to the present invention, is further characterized in that the condensation and evaporation are carried out at the same time by means of the condenser/reboiler between the upper part of said medium-pressure rectification column and the lower part of said low-pressure rectification column, and an external cold is introduced into the condenser in the upper part of said low-pressure rectification column to carry out the condensation.

An ultra-high purity nitrogen trifluoride production method, according to the present invention is further characterized in that an external cold such as liquefied nitrogen or liquefied methane is used as a refrigerant for the condenser for condensation use of said low-pressure rectification column.

An ultra-high purity nitrogen trifluoride production unit, according to the present invention, is characterized by comprising: a medium-pressure rectification column having a condenser/reboiler disposed in its top, a reboiler disposed in its bottom and a rectifying part provided therebetween; a low-pressure rectification column having a condenser for condensation use disposed in its top, with its bottom kept in contact with the condenser/reboiler of said medium-pressure rectification column, and having a rectifying part provided therebetween; a means for cooling down the condenser for condensation use of said low-pressure rectification column; a means for pressurizing, cooling down, and adsorptively purifying a nitrogen trifluoride feed gas; a means for introducing the pressurized feed gas obtained by said means into between the upper rectifying part and lower rectifying part in said medium-pressure rectification column; and a means for introducing the gas rectified in said medium-pressure rectification column into between the upper rectifying part and lower rectifying part in said low-pressure rectification column; where ultra-high purity nitrogen trifluoride is obtained from the lower part of said low-pressure rectification column.

DETAILED DESCRIPTION OF THE INVENTION

Figure 1:
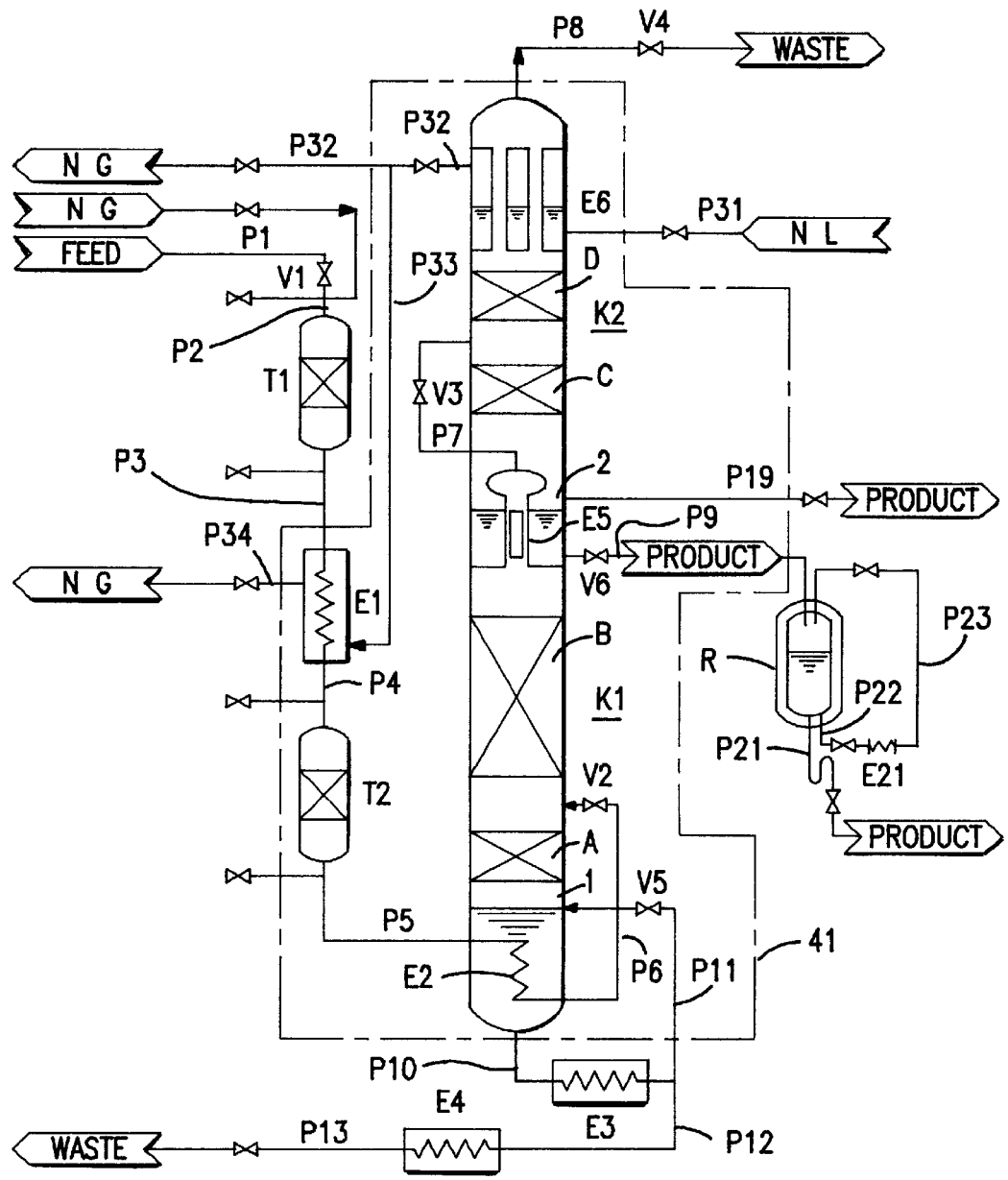
FIG. 1 shows a flow sheet of one example of the ultra-high purity nitrogen trifluoride production unit, based on the present invention.

In the figure, the reference mark T1 represents a normal temperature adsorption column, E1 represents a heat exchanger, T2 represents a low temperature adsorption column, E2 represents a reboiler, K1 represents a medium-pressure rectification column, E5 represents a middle condenser/reboiler, K2 represents a low-pressure rectification column, E6 represents a top condenser, R represents an ultra-high purity nitrogen trifluoride product storage tank, P1 represents a feed gas supply pipe, P8 represents a low boiling point components discharge pipe, P9 and P19 each represents an ultra-high purity nitrogen trifluoride product delivery pipe and P10 represents a high boiling point components discharge pipe, respectively. Liquefied nitrogen is supplied as a refrigerant into the top condenser E6 by means of a pipe P31, and the thus-evaporated nitrogen gas will be taken out by a pipe P32.

The medium-pressure rectification column K1 comprises, in turn from below, a bottom space part 1, a lower rectifying part A, an upper rectifying part B and has the condenser side of the condenser/reboiler E5, where the reboiler E2 is installed in the bottom space part 1. The low-pressure rectification column K2 comprises, in turn from below, a bottom space part 2, a lower rectifying part C, an upper rectifying part D and has the condenser E6, where the reboiler side of said condenser/reboiler E5 is installed in the bottom space part 2. In addition, the heat exchanger E1, low temperature adsorption column T2, medium-pressure rectification column K1, low-pressure rectification column K2 and pipes and valves attached thereto are accommodated in an insulated box 41 so as to be kept at low temperatures. Now, a process for producing ultra-high purity nitrogen trifluoride by use of the aforementioned unit will be described here.

Feed nitrogen trifluoride comes out in its production, as it contains helium (He), hydrogen ($H_2$), nitrogen ($N_2$), fluorine ($F_2$), argon (Ar), oxygen ($O_2$), methane tetrafluoride ($CF_4$), dinitrogen oxide ($N_2O$), carbon dioxide ($CO_2$), dinitrogen tetrafluoride ($N_2F_4$), hydrogen fluoride (HF), dinitrogen difluoride ($N_2F_2$), nitrogen difluoride ($NF_2$), water ($H_2O$) and etc., accompanied as impurities.

Feed nitrogen trifluoride gas consisting of nitrogen trifluoride as a main component and containing the aforementioned impurities, pressurized under a pressure of 6 kg/cm$^2$ or more, is introduced into the normal temperature adsorption column T1 filled with a molecular sieve by a pipe P1 so that $CO_2$ and $H_2O$ are removed therefrom and the content of $CF_4$ is also decreased by its adsorption. The feed gas is then led into the heat exchanger E1, where it is cooled down to about −70° C. through a heat exchange with low temperature nitrogen gas introduced therein as a refrigerant by a pipe P33. The thus-cooled feed gas is introduced into the low temperature adsorption column T2 filled with activated alumina gel through a pipe P4 so that $N_2F_2$, $N_2F_4$, $N_2O$ and $CO_2$ are removed therefrom and the content of CF4 is further decreased. Thereafter, the feed gas is introduced at about −70° C. into the reboiler E2 provided in the bottom space part 1 of the medium-pressure rectification column K1 through a pipe P5.

Through a heat exchange with liquefied gas having a temperature of about −96° C., reservoired in the bottom space part 1 of the medium-pressure rectification column K1, the feed gas introduced at about −70° C. in the reboiler E2 is cooled down and liquefied, and at the same time heats the liquefied gas so that low boiling point gas consisting of $NF_3$ as a main component in the liquefied gas is evaporated and caused to rise through the rectifying part A of the medium-pressure rectification column K1. The feed gas which has been cooled down by the liquefied gas is liquefied in itself, taken out by a pipe P6, and expanded to a pressure of about 6 kg/cm$^2$ by means of an expansion valve V2 inserted in the pipe P6 so as to become a gas-liquid mixed fluid, and this gas-liquid mixed fluid is introduced into between the lower rectifying part A and upper rectifying part B.

The gas phase which has been reboiled so as to rise in the bottom space part of the medium-pressure rectification column K1 is rectified through a direct gas-liquid contact, in the rectifying part A, with the liquid phase (a reflux liquid) of the gas-liquid mixed fluid which has been introduced in the medium-pressure rectification column K1 after expanded by the expansion valve V2, whereby components having higher boiling points than that of $NF_3$, inclusive of $NF_3$, flow down through the rectifying part A and components having lower boiling points than that of $NF_3$, inclusive of $NF_3$, rise here. The gas phase of the gas-liquid mixed fluid which has been introduced in the medium-pressure rectification column K1 after expanded by the expansion valve V2 rises through the rectifying part B. The rectification is carried out also in the rectifying part B as in the rectifying part A. As a reflux liquid necessary in the rectifying part B, the gas which has risen through the rectifying part B is condensed by the condenser/reboiler E5 so as to flow down here. In this condenser/reboiler E5, almost all of gases having higher boiling points than that of $NF_3$ are condensed so as to flow down.

$NF_3$ and the components having lower boiling points than that of $NF_3$ which have not been condensed in the condenser/reboiler E5 are taken out of the condenser/reboiler E5 by a pipe P7, and expanded to a pressure of about 2 kg/cm$^2$ by means of an expansion valve V3 inserted in the pipe P7 so as to become a gas-liquid mixed fluid, and this gas-liquid mixed fluid is introduced into between the lower rectifying part C and upper rectifying part D of the low-pressure rectification column K2.

The liquid phase of said gas-liquid mixed fluid introduced in the low-pressure rectification column K2 flows down through the lower rectifying part C and the gas phase thereof rises through the upper rectifying part D. The liquid phase thereof which flows down through said lower rectifying part C has become high purity $NF_3$. When this high purity $NF_3$ flows down through the lower rectifying part C, it is evaporated by the condenser/reboiler E5 and brought in a gas-liquid contact with the rising gas phase of ultra-high purity $NF_3$ so as to become ultra-high purity nitrogen trifluoride ($NF_3$), from which components having lower boiling points than that of $NF_3$ have been removed, and this ultra-high purity nitrogen trifluoride is reservoired in the bottom of the low-pressure rectification column K2.

The gas phase which has been introduced in said low-pressure rectification column K2 and rises through the upper rectifying part D is rectified through a gas-liquid contact with a reflux liquid flowing down here, which will be mentioned below, whereby $NF_3$ contained in the rising gas phase is dissolved and liquefied in the reflux liquid and $N_2$ and He having lower boiling points than that of $NF_3$, dissolved in the reflux liquid, are evaporated. By virtue of this rectifying action, the reflux liquid, in which the concentration of $NF_3$ has been enhanced, is joined with the aforementioned high purity $NF_3$, and caused to flow down here.

The gas phase which has been rectified in said upper rectifying part D and rises here comprises $N_2$, He and $NF_3$ as main components and contains further traces of $H_2$, $F_2$ and $O_2$. This gas phase is introduced into the condenser E6 so as to be cooled down to a temperature of about $-150°$ C. by liquid nitrogen in the condenser E6, where a major portion of $NF_3$ is collected and liquefied by condensation so as to become a reflux liquid. This reflux liquid is caused to flow down through the upper rectifying part D and lower rectifying part C so as to become ultra-high purity nitrogen trifluoride with a purity of 99.999%, and it is reservoired in the bottom 2 of the low-pressure rectification column K2.

Gas which has not be collected in said condenser E6 is taken out of the top of said low-pressure rectification column K2 by a pipe P8 and introduced into a harmful substances eliminating device. The composition of the gas taken out therefrom comprises about 54% of He, about 36% of $N_2$ and about 9.5% of $NF_3$, and further contains traces of $H_2$, $F_2$ and $O_2$.

Liquid reservoired in the bottom space part 1 of said medium-pressure rectification column K1 is taken out thereof by a pipe P10. At that time, the composition of said liquid comprises about 80% of $NF_3$, about 20% of $N_2O$ and further contains traces of $CO_2$, $N_2F_4$, $H_2O$, HF, $N_2F_2$ and $NF_2$.

The liquid taken out by said pipe P10 is brought in a heat exchange with the atmospheric air in an evaporator (heat exchanger) E3 so as to become a gas-liquid mixed fluid risen in pressure, from which $NF_3$ is almost evaporated. The gas phase thereof is reduced in pressure by means of a valve V5 inserted in a pipe P11, and returned to the gas phase above a reservoired liquid in the bottom space part 1 of the medium-pressure rectification column K1. The liquid phase taken out by said pipe P11 is branched by a pipe P12 and introduced into the heat exchanger E4, where it is brought in a heat exchange with the atmospheric air so as to get normal temperature, and it is then introduced into the harmful substances eliminating device and discharged therefrom.

Ultra-high purity liquid nitrogen trifluoride reservoired in the bottom space part 2 of said low-pressure rectification column K2 is taken out by a pipe P9 and stored in a product storage tank R. In addition, ultra-high purity nitrogen trifluoride gas can be taken out by a pipe P19.

In a practical unit, although not illustrated in FIG. 1, a plurality of said normal temperature adsorption columns T1 and low temperature adsorption columns T2 are installed and they will be switchably used. In addition, nitrogen gas will be heated for use in the regeneration of these normal temperature adsorption column T1 and low-temperature adsorption column T2.

Into the condenser E6 of the low-pressure rectification column K2, liquefied nitrogen is introduced as a refrigerant from an outside by a pipe P31. The liquefied nitrogen is evaporated so as to become low temperature evaporated nitrogen after its cold is utilized. This low temperature evaporated nitrogen is taken out by a pipe P32 and a portion thereof is branched by a pipe P33 and utilized as a cold for the heat exchanger E1. Nitrogen gas which has been utilized as the cold for the heat exchanger E1 is further heated and used as a regeneration gas for the normal temperature adsorption column T1 and low temperature adsorption column T2.

In the embodiment of the aforementioned invention, the operation pressure of said low-pressure rectification column shown in FIG. 1 has been about 2 $kg/cm^2$ and the operation pressure of said medium-pressure rectification column about 6 $kg/cm^2$, respectively. However, the operation pressure of said low-pressure rectification column may be determined to be about 1~7 $kg/cm^2$ and the operation pressure of said medium-pressure rectification column about 5~30 $kg/cm^2$, respectively, by changing the condition of a refrigerant. Although liquefied nitrogen has been utilized as a refrigerant for introducing cold to the condenser for condensation use in the top of said low-pressure rectification column, there may be used a simple substance of liquefied methane or a mixture of liquefied methane and liquefied ethane or liquefied propane. Furthermore, although the reboiler E2, condenser/reboiler E5 and condenser E6 have been installed in the rectification column, they may be installed outside of the rectification column.

According to the ultra-high purity nitrogen trifluoride production method and the unit therefor having the aforementioned construction, based on the present invention, ultra-high purity nitrogen trifluoride can be easily and continuously obtained, where it is possible to carry out its mass production as compared with a production installation of the prior art and it is very useful for decreasing its production cost.

DESCRIPTION OF REFERENCE ELEMENTS

T1—normal temperature adsorption column, T2—low temperature adsorption column, K1—medium-pressure rectification column, k2—low-pressure rectification column, E2—reboiler, 1, 2—bottom space parts, A, B, C, D—rectifying parts, E1, E3, E4—heat exchangers, E5—condenser/reboiler, E6—condenser, R—product storage tank, V1, V2, V3—expansion valves, P—pipe, and 41—insulated box.

What is claimed is:

1. A method of producing ultra-high purity nitrogen trifluoride, which comprises:
   pressurizing a nitrogen fluoride feed gas so as to obtain a pressurized feed gas;
   eliminating moisture and carbon dioxide from said pressurized feed gas, cooling the pressurized feed gas to obtain a cooled feed gas;
   passing the cooled feed gas through at least one adsorption column, and thereafter introducing said cooled feed gas into a medium-pressure rectification column via a reboiler located in a lower part of the medium-pressure rectification column, so as to obtain a resulting gas;
   introducing the resulting gas into a middle stage of a low-pressure rectification column; and
   withdrawing ultra-high purity nitrogen trifluoride from a lower part of the low-pressure rectification column.

2. The method according to claim 1, further comprising warming a liquid reservoired in the bottom of the medium-pressure rectification column so that low-boiling point components dissolved in said liquid are evaporated and returned to the medium-pressure rectification column.

3. The method according to claim 1, wherein the pressure of the low-pressure rectification column ranges from 1 to 7 $kg/cm^2$.

4. The method according to claim 1, wherein the pressure of the medium-pressure rectification column ranges between 5–30 $kg/cm^2$.

5. The method according to claim 1, further comprising, carrying out condensation and evaporation at the same time in a condensor/reboiler located between an upper part of the medium-pressure rectification column and the lower part of the low-pressure rectification column; and introducing an external cold into a condenser located in an upper part of the low-pressure rectification column to carry out the condensation.

6. The method according to claim 1, wherein the external cold used as a refrigerant is one of liquified nitrogen and liquified methane.

7. An ultra-high purity nitrogen trifluoride production plant, which comprises:

a source of nitrogen trifluoride feed gas;

means for pressurizing the feed gas to obtain a pressurized feed gas;

means for adsorptively purifying and cooling said pressurized feed gas to obtain a cooled feed gas;

a medium-pressure rectification column having a condenser/reboiler disposed in an upper part, a reboiler disposed in a lower part, and a rectifying zone provided therebetween, said rectifying zone including an upper rectifying part and a lower rectifying part;

a low-pressure rectification column having a condenser disposed in an upper portion, a lower portion kept in contact with the condenser/reboiler of the medium-pressure rectification column, and a rectifying region provided therebetween, said rectifying region including an upper rectifying portion and a lower rectifying portion;

means for introducing the cooled feed gas between the upper rectifying part and the lower rectifying part in said medium-pressure rectification column;

means for introducing gas rectified in said medium-pressure rectification column between the upper rectifying portion and the lower rectifying portion in the low-pressure rectifying column; and means for removing ultra-high purity nitrogen trifluoride from the lower portion of the low-pressure rectification column.

* * * * *